United States Patent Office 3,271,444
Patented Sept. 6, 1966

3,271,444
SALTS OF $C_{10}$ TO $C_{20}$ 1,2-SULFONIC-SULFINIC ACIDS AND METHOD FOR THEIR PREPARATION
Douglas F. Percival, Martinez, Elmer E. Johnson, San Rafael, and Robert T. Adams, Lafayette, Calif., assignors to Chevron Research Company, a corporation of Delaware
No Drawing. Filed Aug. 12, 1964, Ser. No. 389,208
7 Claims. (Cl. 260—513)

This application is a continuation-in-part of our copending application Serial No. 79,525, filed December 30, 1960, now abandoned.

The subject of this invention is the water-soluble salts of n-alkane-1,2-sulfonic-sulfinic acids having 10 to 20 carbon atoms, preferably 15 to 19 carbon atoms, as prepared by the novel process of the invention. These compounds are useful in detergent compositions.

Detergents prepared from the compounds of this invention have been found to possess superior cleansing properties to detergents prepared according to the art from normal paraffin sulfonates; yet these novel detergents require less α-olefin per pound of product. Furthermore, by the process for preparing the salts of 1,2-sulfonic-sulfinic acid of the invention, more than 90 percent of the olefin charge may be converted to detergent in one-half to two hours, thus providing a commercially practicable process.

The process of the invention comprises adding from about 1 to 2.5 mols, preferably 1.4 to 2.0 mols, per mol olefin of bisulfite ion in the form of an aqueous solution of a bisulfite salt to a mixture of normal terminal olefinic hydrocarbons in the $C_{10}$–$C_{20}$, preferably $C_{15}$–$C_{19}$, range in the presence of a lower alcohol solvent and from about 0.001 to 0.10 mol, preferably 0.005 to 0.02 mol, of a peroxy-containing initiator per mol of olefin. A critical limitation on the process is the pH, which at all times is maintained from about 3.5 to 6.5, preferably 4.0 to 5.5. The pH is carefully controlled within these limits during the reaction, and is continuously maintained within the specified range even while removing the alcohol solvent from the reaction mixture, such as by distillation, and recovering the product.

It is evident, since the novel product of this invention contains 2 mols of sulfur per mol of olefin, that the olefin requirement per pound of detergent product prepared from the compounds of this invention is less than that of detergents prepared from the paraffin sulfonates of the prior art, which have only 1 mol of sulfur per mol of olefin. In spite of this reduction in olefin requirement, the product prepared from the salts of this invention has been found to have equal or better cleansing, foaming, lathering, and bar-forming properties than the prior art products.

The olefinic materials used in the preparation of the sulfonated products of the invention can be any of a broad class of $C_{10}$–$C_{20}$ terminally unsaturated hydrocarbons, regardless of the molecular structure or nature of the olefin. Preferred feed stock is a mixture of primarily straight-chain, terminal olefins having between 10 to 20 carbon atoms, such as those obtained from the cracking of petroleum waxes. Olefins having from 15 to 19 carbon atoms have been found to yield salts possessing especially desirable detergent properties.

Where the olefins contain impurities and/or inhibitors to a bisulfite addition reaction, it has been found desirable to pretreat crude olefinic material to remove some of the undesirable impurities and/or inhibitors prior to the addition. This may be effected by passing the olefin feed through an adsorbent material such as silica gel to remove impurities by adsorption of about 1 to 5 volume percent of olefin feed. The pretreatment may also be accomplished by a mild acid treatment wherein the olefins to be sulfonated are contacted with about 0.5 to about 5.0 volume percent of at least 70 percent by weight $H_2SO_4$ for a short period of time, while recovering a product which has a large proportion of the impurities removed which would otherwise tend to inhibit the bisulfite addition. After the treatment, the sludge from the acid contact is separated from the olefin by a phase separation along with centrifuging and/or filtration followed by distillation of the filtrate obtained as overhead consisting of purified terminal olefins. The foregoing pretreating processes also serve to render the final sulfonated product more suitable for detergent manufacture.

The bisulfite ion used may be employed in the form of an aqueous solution of ammonium bisulfite, various amine bisulfites, such as triethanolamine bisulfite, the alkali metal or alkaline earth metal bisulfites, such as sodium, potassium, calcium, strontium, magnesium, etc.; the alkali metal and ammonium bisulfites are preferred. The concentration of bisulfite ion in this solution is limited only by the water solubilities of the respective bisulfite salts at the temperature involved. Additional amounts of water, however, may be employed to optimize the amount of bisulfite ion which remains in solution after the aqueous bisulfite solution has been admixed with the olefin mixture. In practice, aqueous solutions having a concentration of bisulfite ion of about 1 molar to about 6 molar have been found satisfactory. If desired, bisulfite ion may be generated in situ by the addition of sulfur dioxide and alkali to the reaction mixture.

In carrying out the invention, a batch, semi-continuous or fully continuous process can be employed. In a batch process, at the start there are usually three phases present. The first phase contains predominantly olefin and solvent; the second phase is an aqueous solvent phase containing olefin and dissolved bisulfite; the third phase is essentially an aqueous solution of bisulfite. However, when the concentration of bisulfite in the reaction mixture is sufficiently small, the third phase may not exist at all. After the reaction has proceeded so as to form a substantial amount of product, phases may combine leaving only one phase containing both reactants and product. A continuous process may be carried out by regulating the addition of bisulfite so that after the reaction is sufficiently under way, a one-phase system is continuously maintained which contains both reactants and products. To accomplish, the amount of excess bisulfite ion in the mixture is maintained below a predetermined level at which a phase separation has been found to take place. In practice, 0.05 to 0.25 mol, preferably 0.1 to 0.15 mol, excess bisulfite ion per mol of olefin introduced has been found satisfactory.

Because of the low solubility in water of a major portion of the olefins to be treated, a sufficient amount of a solvent for all the olefin is employed. This solvent is anhydrous or aqueous alcohol, preferably a lower monohydric alcohol, e.g., methanol, ethanol, isopropanol, n-propanol, or a combination thereof, such as Formula 3A alcohol containing about 86 weight percent ethanol, 4.6 weight percent methanol, and the remainder water. In practice, the amount of solvent present in the reaction can vary from about 100 to 1000 weight percent based on olefin, or more. A suitable reaction mix for most purposes can be obtained by employing an aqueous solution of the alcohol in concentrations such that after the total amount of aqueous solution of bisulfite ion is included in the reaction mix, the alcohol-water weight ratio is from about 1:3 to about 9:1, preferably 1:2 to about 6:1. Thus, a 1:1 weight ratio of Formula 3A alcohol to water provides a good solubilizing effect for both the olefin and the bisulfite.

Because of the fast rate of reaction observed in the process of the invention, the total reaction time to obtain a high conversion to product is much less than the time required by processes of the prior art. The manner of addition of bisulfite salt, moreover, whether it is added all at once or in stages, is not critical either in a batch or continuous process. Free bisulfite ion is always present, however, in the reaction mixture so that the reaction may proceed. If bisulfite is to be added gradually during the course of the reaction, the need for further addition may be ascertained by periodic withdrawal of samples of reaction mixture for analysis of free bisulfite content by means of iodine titration.

The choice of a suitable initiator is not critical. Nitrogen-containing initiators may be used, for example, $\alpha,\alpha'$-azodiisobutyronitrile. Also satisfactory are inorganic peroxides, such as hydrogen peroxide and sodium peroxide; and organic peroxides, such as benzoyl peroxide and methylethylketone peroxide. However, the preferred initiators are the aliphatic and aromatic peresters in which the peroxy group is attached to at least one tertiary carbon atom, such as t-butyl perbenzoate, t-butyl pertoluate, and di-t-butyl perphthalate, suitable amounts of which range from about 0.001 to 0.10 mol per mol of olefin, with preferred amounts of ranging from 0.005 to 0.02 mol per mol of olefin.

Control of pH is essential to the novel process of the invention. It has been found that the yield of the salt of alkane-1,2-sulfonic-sulfinic acid salt is materially decreased as the pH increases. It is therefore extremely important to maintain the pH between about 3.5 and 6.5, preferably between 4 and 5.5, during both the course of the reaction itself and during the purification and recovery step in which the alcohol is removed in order to avoid decomposition of the salt. This may be accomplished by addition of sulfur dioxide gas to lower the pH or a suitable aqueous hydroxide solution to raise it. Since the product may sometimes be preferred in aqueous solution, evaporation of water may be unnecessary. However, where a dry product is required, the product is evaporated to dryness while still maintaining the pH within the disclosed range.

In batch operation, it has also been found advantageous to carry out the reaction in the presence of a small amount, up to about 15 mol percent based on the olefin to be reacted, of preformed salt, such as that obtained as product.

The temperature employed during the reaction can vary widely, from a low of about 20° C. to a high of about 200° C. For the preferred organic perester initiators, temperatures ranging from about 40° C. to 80° C. are found to be highly suitable.

If desired, following the bisulfite addition, a solvent deoiling step may be employed to remove unreacted hydrocarbons. These may be removed by extraction with a light hydrocarbon such as n-pentane, or by dilution with water to effect the phase formation of the oil and sulfonate followed by a phase separation, such as by decantation.

The recovery of the sulfonate prepared according to the process of the invention may be simply accomplished by removing the alcohol, such as by distillation, while keeping the pH within the disclosed range; if desired, the water may also be evaporated to obtain a dry product.

A desalting step may be employed, either directly upon the crude reaction product or upon the deoiled salt to remove any remaining inorganic salts such as bisulfates or sulfates formed in the reaction. Desalting of the crude product can be effected by cooling the mixture and allowing the salt to crystallize. Seed crystals may be used to speed the crystallization. Desalting of the deoiled product may be accomplished by contacting said product with a suitable desalting solvent, such as n-propanol, after which the solvent is removed by distillation.

In a preferred embodiment of the invention, $\alpha$-olefin feed stock and solvent, either separately or premixed, are charged to an agitated reaction zone, such as a stirred tank reactor, along with the desired quantity of peroxide catalyst. Alternatively, a tubular reactor or several stages of continuous-flow stirred tank reactors may be employed. A solution of a bisulfite salt is continuously added to the reaction zone at a rate from about 1 to 2.5, preferably 1.4 to 2.0, mols bisulfite ion per mol olefin charged. The pH is maintained between about 3.5 to 6.5, preferably 4 to 5.5, by the addition of an aqueous hydroxide or sulfur dioxide gas. The required rate of addition can be ascertained by continuously observing the concentration of bisulfite ion in the mixture by periodic titrations with iodine. There should always be present in the reaction mix at least some free bisulfite ion, and an excess thereof which tends to cause the reaction to proceed at a faster rate is preferred, said excess being in the range of about 0.05 to about 0.25 mol per mol original olefin introduced, preferably about 0.1 to 0.15 mol.

Reaction product is continuously removed from the agitated reaction zone and passed to an extraction zone to which a solvent such as n-pentane is charged to extract the unreacted olefin. The mixture is then passed to a phase separation zone wherein two phases are formed, one containing the product and another including the solvent and unreacted olefin, the latter phase being removed and passed to a solvent recovery zone. There the solvent is removed from the olefin by distillation and recycled to the extraction zone. If desired, the unreacted olefin may be recycled to the reaction zone.

The salt products from the phase separation zone is passed to a desalting zone and any undesirable salts, such as sulfates, removed by admixing the product with a desalting solvent, e.g., n-propanol. The product is then separated from the mixture and the bisulfite salt and desalting solvent may be recovered and recycled, respectively, to the reaction and desalting zones.

It is also possible to desalt the crude reaction mixture prior to the removal of unreacted olefin either by the use of a desalting solvent, as above described, or by passing the crude mixture directly to a cooling zone wherein the crude product is cooled to allow crystallization of the salt; if necessary, seed crystals may be admixed to start the crystallization. The crude product is then decanted from the salt crystals and passed to an extraction zone, wherein the product phase is removed and the unsulfonated portion extracted by means of a solvent, such as n-pentane, as previously described.

The product phase is passed to a purification zone, wherein the alcohol is removed by distillation while the pH is maintained as before described in the range used for the bisulfite addition. The aqueous solution of the product may be used directly or passed to an evaporation zone wherein the water is evaporated to leave a dry product.

The superior cleansing and foaming properties of the detergent product of the invention over the normal primary sulfonate detergents of the prior art, as well as the fast conversion rates obtained by the process of the invention, are more clearly illustrated by the following examples. It is to be remembered that these examples are intended merely as illustrations of preferred embodiments of the invention and are not to be construed as further limitations on the invention as hereinbefore described.

Example 1

A mixture of 127 g. of a mixture of $C_{10}$-$C_{20}$ normal primary olefins obtained from the cracking of petroleum waxes, 148 g. sodium bisulfite, 167 g. Formula 3A alcohol, 174 g. water, and 65 g. preformed product was stirred and heated to about 160° F. 2 g. of t-butyl perbenzoate were then added, and after one hour, the degree of conversion to detergent product was determined and found to be about 85 mol percent based on olefin charged. After one hour and twenty minutes, the conversion had increased to about 96 percent, and after one hour and forty minutes, the conversion was essentially complete. The product was then deoiled, desalted, and evaporated to dryness, as described herein, before subsequently analysis and testing.

In order to ascertain and confirm the nature of the product, two methods were used. First, the product was titrated in a nonaqueous medium with perchloric acid using acetic anhydride as solvent. This titration was carried out using glass and calomel electrodes and recording potential versus ml. of titrant. By this method, the amount of sulfinic acid may be ascertained graphically. This amount corresponded to a product having about 42 percent of the disalt of 1,2-sulfonic-sulfinic acid. A second method, the hydrolysis of the product with sulfuric acid followed by titration with Hyamine, was used to confirm the above nonaqueous titration. The titration with Hyamine showed the product to contain about 42.5 percent of the same salt, thus confirming the results of the nonaquous titration.

Part of the product was formed into a detergent bar and was found to possess excellent bar-forming characteristics. The bar prepared from the detergent composition of the invention was demonstrated to be as good or better than conventional bars with respect to ease of lathering, type and stability of foam, ease of rinsing, and feel of the hands after drying.

Still another portion of the dried, powdered product was compared with a conventional paraffin monosulfonate using an unusually hard water (3000 p.p.m. hardness obtained by additional of 2000 parts $CaCO_3$ and 1000 parts $MgCO_3$ per million parts water). Five gram samples of the detergent of the invention and a conventional sulfonate were separately admixed with 100 ml. of the hard water, and vigorously agitated in a Waring blender for 30 seconds. The product of the invention had a foam volume of 20 percent greater than the conventional detergent. Furthermore, an additional 25 percent more of the this foam remained after ten minutes with the detergent of the invention, showing a foam stability of the invention detergent to be superior to that of the prior art detergents. These tests shows the outstanding detergent characteristics of the product of this invention even under the extremely unfavorable hardwater condition tested.

The control of pH is an essential feature of the invention in order to obtain a high yield of the desirable salt of a 1,2-sulfonic-sulfinic acid. The following example shows the effect of pH on yield.

Example 2

205 g. of a $C_{10}$-$C_{20}$ normal α-olefin mixture obtained from the cracking of petroleum waxes, 205 g. isopropanol, 110 g. of water, 26.6 g. of preformed product, and 25 ml. of 3.95 N sodium bisulfite were charged to a reactor and heated to about 170° F. 3 g. of t-butyl perbenzoate were added to initiate the reaction. Additional bisulfite solution was added as required to maintain an excess of free bisulfiate. Where a pH on the high side of the desired pH range was used, 6.25 N aqueous sodium hydroxide was added as required to maintain the pH at the desired level. Where a pH on the lower, preferred side of the pH range was employed, sulfur dioxide gas was added at the beginning of the reaction to attain this pH.

After homogeneous solution was obtained, indicating that the reaction had gone essentially to completion, the percent of the product which was the 1,2-sulfonic-sulfinic acid salt was measured.

The following table shows the results of three different experiments carried out as above described at three different pH values. The yields were calculated in mol percent based on olefin charged.

| pH: | Percent 1,2-sulfonic-sulfinic acid salt |
|---|---|
| 3.7–4.3 | 94 |
| 5.3–6.0 | 84 |
| 7.0–7.9 | 40 |

Example 3

Normal 1-dodecene was reacted with a 0.35 molar excess of ammonium bisulfite according to the method used in the previous examples. The reaction product was shown by analysis to contain 34 percent of the disalt of n-dodecyl 1,2-sulfonic-sulfinic acid. Where a 2 molar excess of ammonium bisulfite was employed, the yield of this salt was 52 mol percent based on olefin charged.

To characterize the 1,2-sulfonic-sulfinic salt, 50 mls. of the above aqueous reaction product were added to 20 g. of silver nitrate in 50 mls. of water. The resulting pale, cream-colored, precipitated, silver dodecane-1,2-sulfonate-sulfinate salt was collected by filtration and dried after which it was added to 20 mls. of methyl iodide dissolved in 100 mls. of petroleum ether. The resulting methyl ester was fractionally crystallized from petroleum ether yielding colorless needle crystals:

Melting point range, ° C. _____ 72–73
Saponification equivalent _____ 342 and having a characteristic infrared absorbance ($CCl_4$ solvent, 0.2 mm. path, and $CCl_4$ reference) at the following wave numbers in cm.$^{-1}$: 950, 985, 1138, 1180, 1318, 1370, 1408, 1460, 2850, and 2930. Correspondingly, the sodium salt had an infra absorbance (squeezed path, mineral oil medium, and NaCl reference) at the following wave numbers in cm.$^{-1}$: 980, 1140, 1175, 1380, 1410, 1470, 2900, and 2970.

The dimethyl ester above was found to have the following analysis:

|  | C | H | S |
|---|---|---|---|
| Calculated ($C_{14}H_{30}S_2O_5$) | 49.1 | 8.76 | 18.7 |
| Found | 49.2 | 8.45 | 18.8 |

A further portion of the above ammonium salt solution was converted to the di-S-benzyl thiuronium salt. It was found to melt at 148–150° C. Its analysis was as follows:

| Element | Theory | Found |
|---|---|---|
| C | 51.9 | 52.7 |
| H | 7.27 | 7.28 |
| N | 8.65 | 8.45 |
| S | 19.8 | 18.6 |

This analysis confirms the $C_{28}H_{48}N_4S_4O_5$ formula for the di-S-benzyl thiuronium salt of n-dodecyl 1,2-sulfonic-sulfinic acid.

Example 4

A detergent product prepared according to this invention at a pH of about 5 containing about 47 percent of the disodium salts of 1,2-sulfonic-sulfinic acids prepared in alcohol solvent from normal primary olefins having from 10 to 20 carbon atoms was treated with a sodium hydroxide solution in order to momentarily raise the pH to about 11. The pH was immediately lowered to about 6 with hydrochloric acid and the material analyzed for disalt content. It was found that allowing the pH to rise above the limits of the invention, even though for only a brief period of time, caused a reduction in the amount of disalt product of the invention from 47 to 15 percent, showing the extreme importance of maintaining the pH within the disclosed limits during removal of alcohol and any other subsequent processing steps to obtain the final detergent product.

As will be evident to those skilled in the art, various modifications on the process can be made or followed, in the light of the foregoing disclosure and discussion, without departing from the spirit or scope of the disclosure or from the scope of the claims.

We claim:

1. A method of preparing a salt of an n-alkane-1,2-sulfonic-sulfinic acid from an olefinic hydrocarbon feed selected from the group consisting of normal terminal $C_{10}$–$C_{20}$ olefins and mixtures thereof, which comprises reacting a bisulfite salt with said olefin by adding an aqueous bisulfite solution containing for each mol of said olefin from about 1 to 2.5 mols of bisulfite to said olefin dissolved in an alcohol solvent containing for each mol of said olefin from 0.001 to 0.10 mol of an organic tertiary-butyl perester, and by maintaining the resulting reaction solution pH in the range from about 3.5 to 6.5 during said addition and thereafter while removing said solvent, thereby recovering the resulting salt of the corresponding n-alkane-1,2-sulfonic-sulfinic acid.

2. Method as in claim 1, wherein said initiator to olefin mol ratio is in the range from about 0.005 to 0.02, respectively, and wherein said pH is in the range from about 4.0 to 5.5.

3. Water soluble salts of $C_{10}$–$C_{20}$ normal alkane-1,2-sulfonic-sulfinic acids or mixtures thereof.

4. Process for the production of an alkaline salt of an n-alkane-1,2-sulfonic-sulfinic acid from a monoolefinic hydrocarbon feed selected from the group consisting of normal $C_{10}$–$C_{20}$ terminal olefins and mixtures thereof, which comprises reacting bisulfite ion with said olefin at a temperature in the range from about 20° to 200° C. by adding an aqueous alkaline bisulfite ion salt solution in an amount in the range from 1 to 2.5 mols of bisulfite ion per mol of olefin to said olefin dissolved in a lower alcohol containing for each mol of said olefin from about 0.005 to 0.02 mol of an organic tertiary-butyl perester initiator; and by maintaining the resulting reaction solution pH in the range from about 4 to 5.5 during said addition and thereafter while removing said solvent, thereby recovering the resulting salt of the corresponding n-alkane-1,2-sulfonic-sulfinic acid.

5. Process as in claim 4, wherein said olefin is of the $C_{15}$–$C_{19}$ range.

6. Process for the production of an alkaline salt of an n-alkane-1,2-sulfonic-sulfinic acid from a monoolefinic hydrocarbon feed selected from the group consisting of normal $C_{10}$–$C_{20}$ terminal olefins and mixtures thereof, which comprises reacting bisulfite ion with said olefin at a temperature in the range from about 20° to 200° C. by adding an aqueous alkaline bisulfite ion salt solution in an amount in the range from 1 to 2.5 mols of bisulfite ion per mole of olefin to said olefin dissolved in a lower alcohol containing for each mol of said olefin from about 0.005 to 0.02 mol of an organic tertiary-butyl perester initiator; and by maintaining the resulting reaction solution pH in the range from about 3 to 6.5 during said addition and thereafter while removing said solvent by addition of sulfur dioxide gas, thereby recovering the resulting salt of the corresponding n-alkane-1,2-sulfonic-sulfinic acid.

7. Water-soluble alkaline salts of $C_{10}$–$C_{20}$ normal alkane-1,2-sulfonic-sulfinic acids or mixtures thereof.

References Cited by the Examiner

UNITED STATES PATENTS 2,318,036   5/1943   Werntz _____ 260—513

FOREIGN PATENTS 1,250,163   11/1960   France.

OTHER REFERENCES

Kolker et al.: J. Chem. Soc., vol. 127, 1925, pp. 310–315.

Mayo et al.: Chem. Reviews, vol. 27, 1940, pp. 394–397.

LORRAINE A. WEINBERGER, *Primary Examiner.*

B. EISEN, M. WEBSTER, *Assistant Examiners.*